United States Patent [19]

Hess et al.

[11] Patent Number: 5,558,178
[45] Date of Patent: Sep. 24, 1996

[54] METHOD AND ARRANGEMENT FOR CONTROLLING A MOTOR VEHICLE

[75] Inventors: Werner Hess, Stuttgart; Hong Zhang, Bietigheim-Bissingen, both of Germany

[73] Assignee: Robert Bosch GmbH, Stuttgart, Germany

[21] Appl. No.: 157,993

[22] Filed: Nov. 26, 1993

[30]     Foreign Application Priority Data

Nov. 26, 1992 [DE] Germany .................. 42 39 711.1

[51] Int. Cl.$^6$ .................................................. B61C 15/12
[52] U.S. Cl. ............... 180/197; 364/426.02; 364/426.03; 364/431.03
[58] Field of Search ................ 180/197; 364/426.02, 364/426.03, 431.03, 431.04, 431.05, 424.07

[56]              References Cited

U.S. PATENT DOCUMENTS 4,715,012  12/1987  Mueller, Jr. .................. 364/424.07
5,262,952  11/1993  Tsuyama et al. .................. 364/426.03
5,283,742   2/1994  Wazaki et al. .................... 364/426.03
5,287,279   2/1994  Anan ............................... 364/426.03
5,297,646   3/1994  Yamamura et al. ................. 180/197
5,330,027   7/1994  Glover ............................ 364/426.03

OTHER PUBLICATIONS

"Integrated Vehicle Control"; Schilke et al Oct. 17–18, 1988—GM Research Laboratories, aka Project Trilby.

*Primary Examiner*—Anne Marie Boehler
*Attorney, Agent, or Firm*—Walter Ottesen

[57]                ABSTRACT

The invention is directed to a method and an arrangement for controlling a motor vehicle having a plurality of component systems. A first one of the component systems is a motor control system. An interface position is defined between various ones of the component systems and faces toward the first component system. The interface position operates on the basis of the torque generated by the motor. The component systems exchange data via the interface position with respect to this torque for controlling the motor vehicle.

13 Claims, 6 Drawing Sheets

METHOD AND ARRANGEMENT FOR CONTROLLING A MOTOR VEHICLE

BACKGROUND OF THE INVENTION

Modern motor vehicles are characterized by a plurality of electronic systems such as electronic injection and ignition controls and/or ABS systems. Additional electronic systems must be introduced in order to in the future satisfy ever increasing requirements as to: compatibility with respect to the environment, wear, safety and/or comfort of the motor vehicles. The most important systems are the following: electronic engine power control systems (the so-called electronic gas system), road-speed control systems, anti-skid or engine braking torque control systems (ASR/MSR) and/or electronic transmission control systems as well as chassis control systems, steering systems including electronic rear-wheel steering, control systems for maintaining distance between motor vehicles, navigation systems and/or traffic guidance systems.

In this connection, it is to be noted that the above-mentioned component systems intervene at least in several subranges of their function on the output power of the motor vehicle, for example, the transmission control during gear shifting operation, the ASR-system for anti-skid control, a control system for controlling the distance to a motor vehicle travelling forward of the subject vehicle and the like. This further increases the complexity of the total system for controlling the motor vehicle. An optimal cooperative relationship between the component systems is necessary, however, to obtain a satisfactory control of the motor vehicle. It is an object to reduce the cross coupling between the individual component systems and thereby obtain an independent application and control of each component system.

A first step in this direction is disclosed in U.S. Pat. No. 5,351,776 filed on Apr. 6, 1992. Here, and proceeding from a driver command, a hierarchically arranged system structure is proposed wherein interface positions are defined between the individual logic component systems via which data with respect to one of the variables are transmitted. This variable is to be adjusted by the next-lower hierarchical level. Data with respect to a motor torque desired value are transmitted for adjusting the motor power via the control of the air supplied, the fuel metered as well as the ignition time point. A detailed description of this interface position, which is directed toward the motor control system, is not provided in the above-mentioned patent application.

SUMMARY OF THE INVENTION

It is an object of the invention to provide a method and an arrangement for controlling a motor vehicle with at least one electronic component system in addition to the motor control system. An interface position is provided in the direction toward the motor control system which can be operated by all available component systems and which can be applied independently of motor types as well as independently of the variables available for influencing the motor and independently of the component systems communicating with the motor control system.

This is achieved in that at least values from at least one component system in at least one operating state are transmitted to the motor control system. These values are with reference to a variable which can be influenced by adjusting at least one of the power parameters of the motor and the variable is supplied by the motor control system by adjusting at least one of the power parameters present. The variable defines a parameter which is either a measure for the power capacity of the motor, a measure for the torque supplied by the motor or the power supplied by the motor.

German patent application 42 32 974.4 discloses that a desired motor torque can be supplied by influencing the air supply and the ignition while computing and adjusting the combustion torque necessary therefor.

U.S. Pat. No. 5,484,351, filed Jun. 1, 1993, discloses that lost torque (torque attributed to friction and bearing play, for example), torque attributed to additional consumers and corrective torques (for example, of an idle controller) are considered when adjusting the motor torque and to adapt these torque components, that is, to consider possible changes of these torque components.

The procedure provided by the invention provides a unified interface position to the motor control system which reduces cross coupling between the component systems and permits an independent application and control of each component system.

It is especially advantageous with respect to this procedure provided by the invention that the suggested interface position is configured so as to be modular so that the interface position is unaffected when a substructure (for example, electronic control of the air supply) of the motor control is eliminated.

It is especially significant that the interface position is so configured that communication between different control system types is possible without influencing the interface position. The different control systems can also be made by different manufacturers.

With the configuration of the interface as provided by the invention, a fine metering of the following is advantageously provided: the power capacity of the motor, the torque supplied by the motor or the power supplied. Also, a reduction of the additional exhaust gas load is provided for which occurs from component systems when intervening on the motor.

It is further advantageous that structure and characteristic fields as well as characteristic lines for realizing the interface position in the region of the motor control system can be simplified in dependence upon the requirements as to precision.

The interface position according to the invention is especially advantageous in combination with an ASR intervention and/or an MSR intervention by suppressing selected injection pulses and/or correcting the ignition angle and/or during an intervention in a motor by a transmission control during the gear-shifting operation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
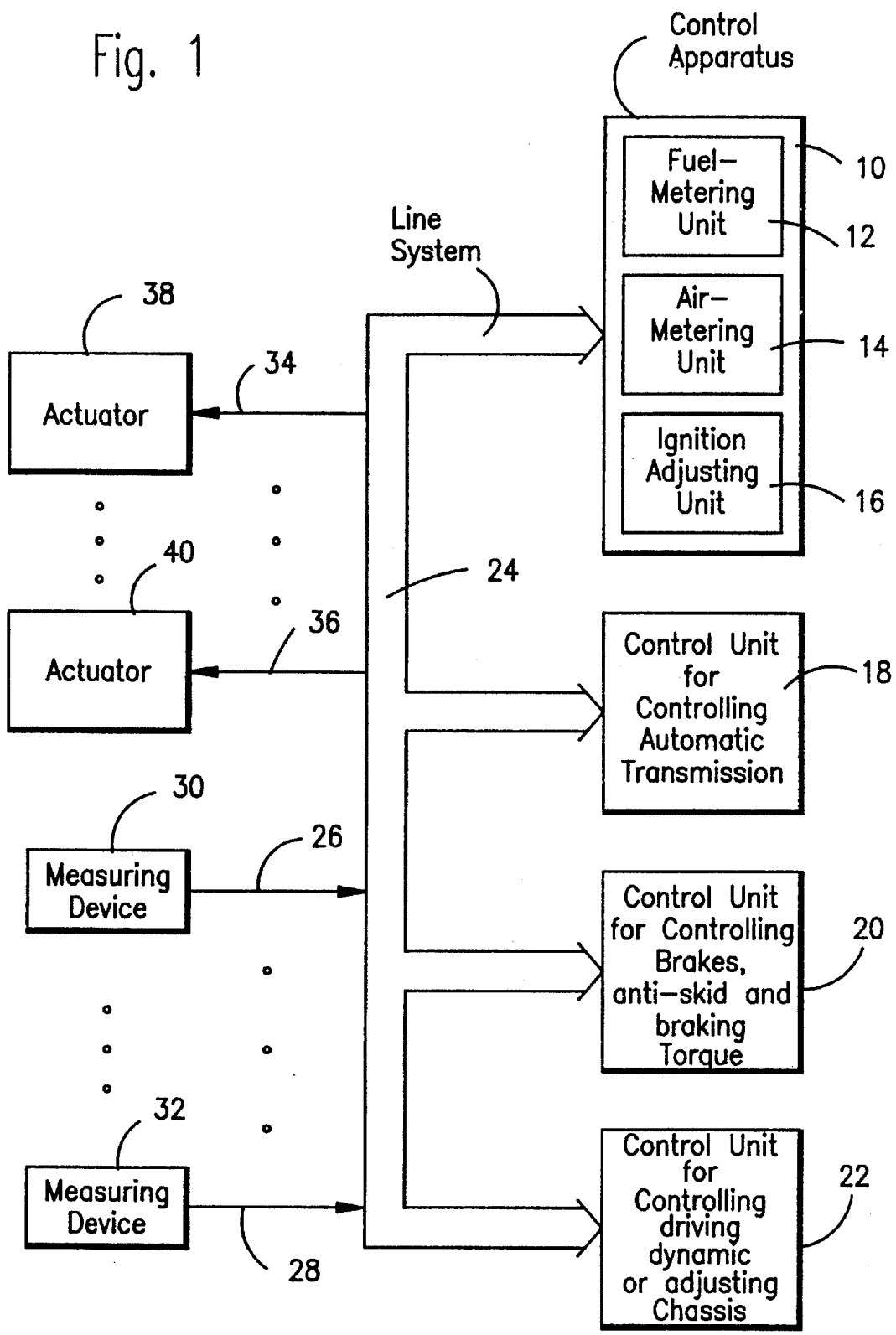
FIG. 1 is a block circuit diagram of the configuration of a modern control system for a motor vehicle.

FIG. 1 shows a control system for a motor vehicle as an overview block circuit diagram. The system includes a control apparatus 10 for controlling the motor and is equipped with a unit for fuel metering 12, a unit for air metering 14 and/or a unit for adjusting ignition 16. In addition, the following are provided: a control unit 18 for controlling an automatic transmission, a control unit 20 for controlling the brakes as well as for carrying out an anti-skid control or motor braking torque control and/or a control unit 22 for controlling the driving dynamic or for adjusting the chassis. These control units are connected to each other via the line system 24 (communication system) such as via the so-called CAN-bus so that the units can mutually exchange data. Measuring devices 30 to 32 are connected to the line system 24 via corresponding lines 26 to 28. The measuring devices 30 to 32 detect operating variables from the engine, drive train and/or motor vehicle. The detected operating variables comprise generally known operating variables such as motor rpm, motor temperature, battery voltage, wheel rpm, road speed, output rpm, transmission position, turbine rpm, et cetera. Also, actuators 38 to 40 for carrying out the various control functions are connected to the line system 24 via respective lines 34 to 36. These control functions include, for example, fuel injection systems, ignition systems, electrically controllable throttle flaps, positioning devices of an automatic transmission such as clutches, actuating devices for the chassis (electrically controllable spring damping elements) as well as pressure systems for brake actuation.

The control units shown in FIG. 1 carry out the functions assigned thereto while detecting the operating variables necessary therefor and form control values for the various actuating units. Component functions are necessary for the foregoing such as in combination with an anti-skid or motor braking torque control, a transmission control for controlling the gear-shifting operation as well as interventions in the drive power of the drive unit when controlling the chassis and thereby interventions into the motor control system 10. The communication between the control units 18 to 22 and the motor control system 10 is determined by an interface position to be provided. A unified interface position having a modular configuration and with the above-mentioned advantages is provided by the invention described below.

Figure 2:
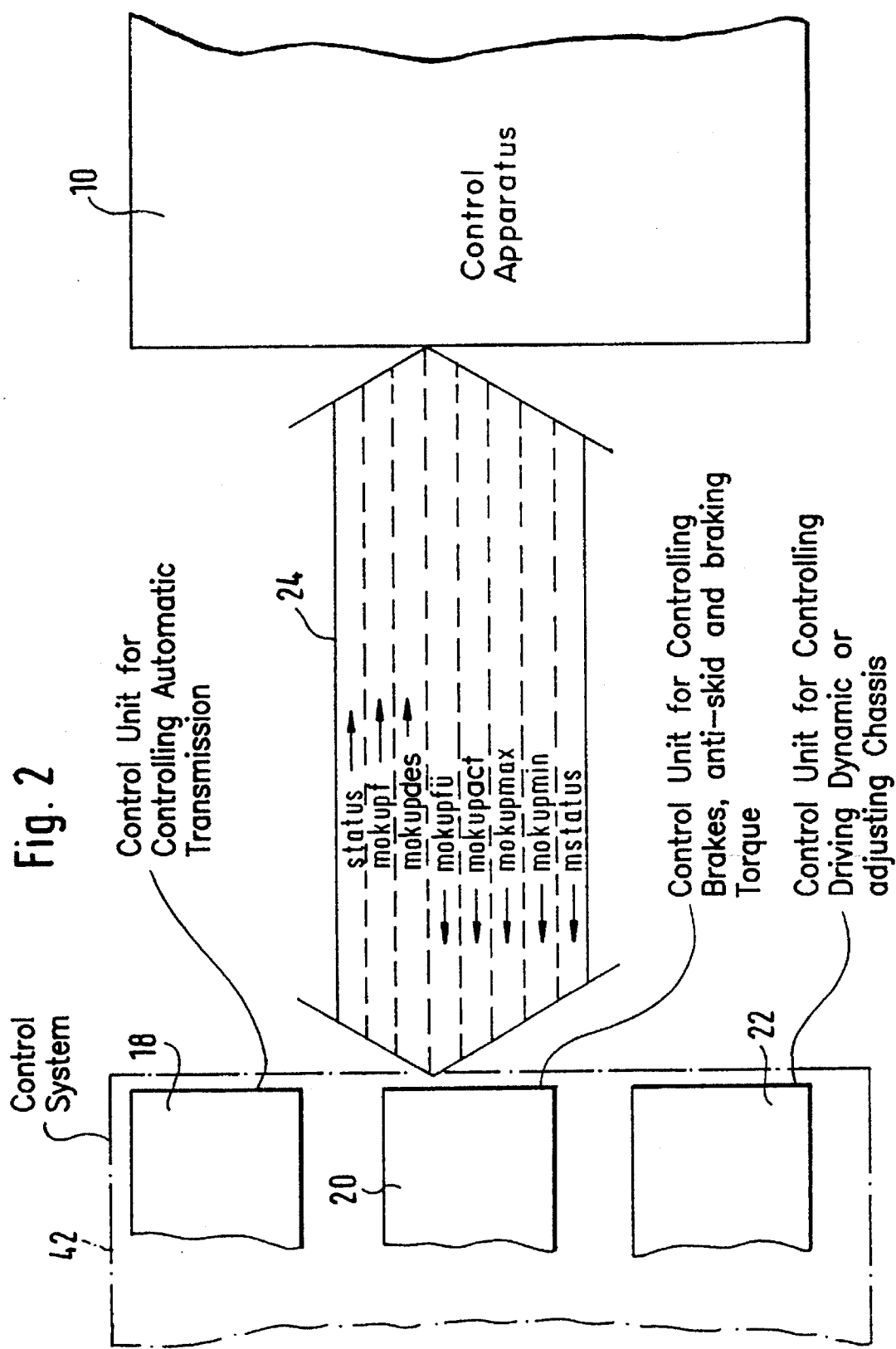
FIG. 2 is a circuit block diagram of an embodiment of the interface according to the invention.

FIG. 2 shows the connection to the motor control system. The configuration described is an embodiment of the invention which defines the most sophisticated interface positions possible in the context of the invention.

In FIG. 2, the motor control system 10 is shown at right which is connected via the line system 24 to the individual control units or component systems 18 to 22 which are combined in the control system 42, represented by the broken line. Data is exchanged between the control systems via the line system 24 for carrying out the control functions. First, a desired value is needed which defines a measure for a variable characterizing the power output or power capacity of the motor. This desired value can, for example, be a desired clutch torque (mokupdes) which occurs at the crankshaft of the motor. Alternatively, a desired value for the indexed torque (combustion torque movdes) can be transmitted. The indexed torque or combustion torque is that torque which is developed by the action of the piston. The relationship between the combustion torque and the clutch torque is provided by a simple conversion and the combustion torque corresponds to the clutch torque plus the sum of the lost torque moverl, which is consumed by the mass of the drive unit, and further torque amounts from consumers mona. In addition, a desired value for the power of the motor (Pdes) can also be transmitted.

Status data with respect to control units 18 to 22 and/or the driver command mokupf are supplied to the motor control 10 in dependence upon the configuration of the motor vehicle control system. If the motor control system includes processing the driver command, then the transmission of this data can be omitted or the transmission can take place from the motor control system 10 to the component systems 18 to 22. In addition, the transmission of data with respect to the status of the component systems 18 to 22 can be omitted when these systems are logically connected to each other in such a manner that the transmitted desired value already considers all operating states of the component systems 18 to 22, that is, when, for example, the transmission control unit determines a corresponding desired value for the motor adjustment from its own data, the commands of the ASR-control/MSR-control and/or of the chassis control in the sense of a superior control unit. Data is transmitted from the motor control system 10 to the component systems 18 to 22 with respect to the actual value of the variable represented by the desired value, for example, the clutch torque actual value (mokupact) or the actual value of the alternatively used variables, data with respect to the maximum and minimal values of this variable (mokupmin, mokupmax), a value of this variable mokupfü made available by the combustion as well as status data of the motor control such as whether an intervention in the ignition adjustment or an intervention in the metering of fuel, (for example interrupting injection) is possible or with respect to the operating state of the motor (idle or overrun).

The number of the transmitted data can be reduced in dependence upon the following: the configuration of the motor vehicle control system, the availability of actuating variables and intervention possibilities and the necessity of each piece of information. For example, the data exchange of the driver command, of the maximum clutch torque and possibly of the actual clutch torque can be omitted only for an ASR control with injection intervention and ignition intervention without possibility of electronic influencing of the air supplied.

A unified motor torque interface position can be realized by the interface position according to the invention. This motor torque interface position realizes a slow changeable torque intervention via the supply of air as well as a rapid torque intervention via injection and ignition angle. The motor interface position is further configured so as to be modular and, when an actuating variable is not available (for example, it is not possible to electrically adjust the supply of air), only this component structure is not active without further intervention in the interface position.

The basic idea is to realize the desired power output or the desired power capacity (preferably the desired motor torque) by changing all motor actuating variables which are available. These variables include the air supply, ignition setting and metering of fuel. In today's systems, the supply of air is determined either directly by the accelerator pedal or is adjustable electrically by providing electrical decoupling from the accelerator pedal. In the first case, the driver has adjusted the motor torque in the steady-state condition and the motor intervention of the ASR control or the transmission control then takes place by changing the ignition setting and/or the metered fuel, for example, by suppressing selected injection pulses. A desired motor torque mokupf is preset when the air supply is influenced electronically, for example, by a higher-order level, a drive train control or by the motor control system itself.

Figure 3:
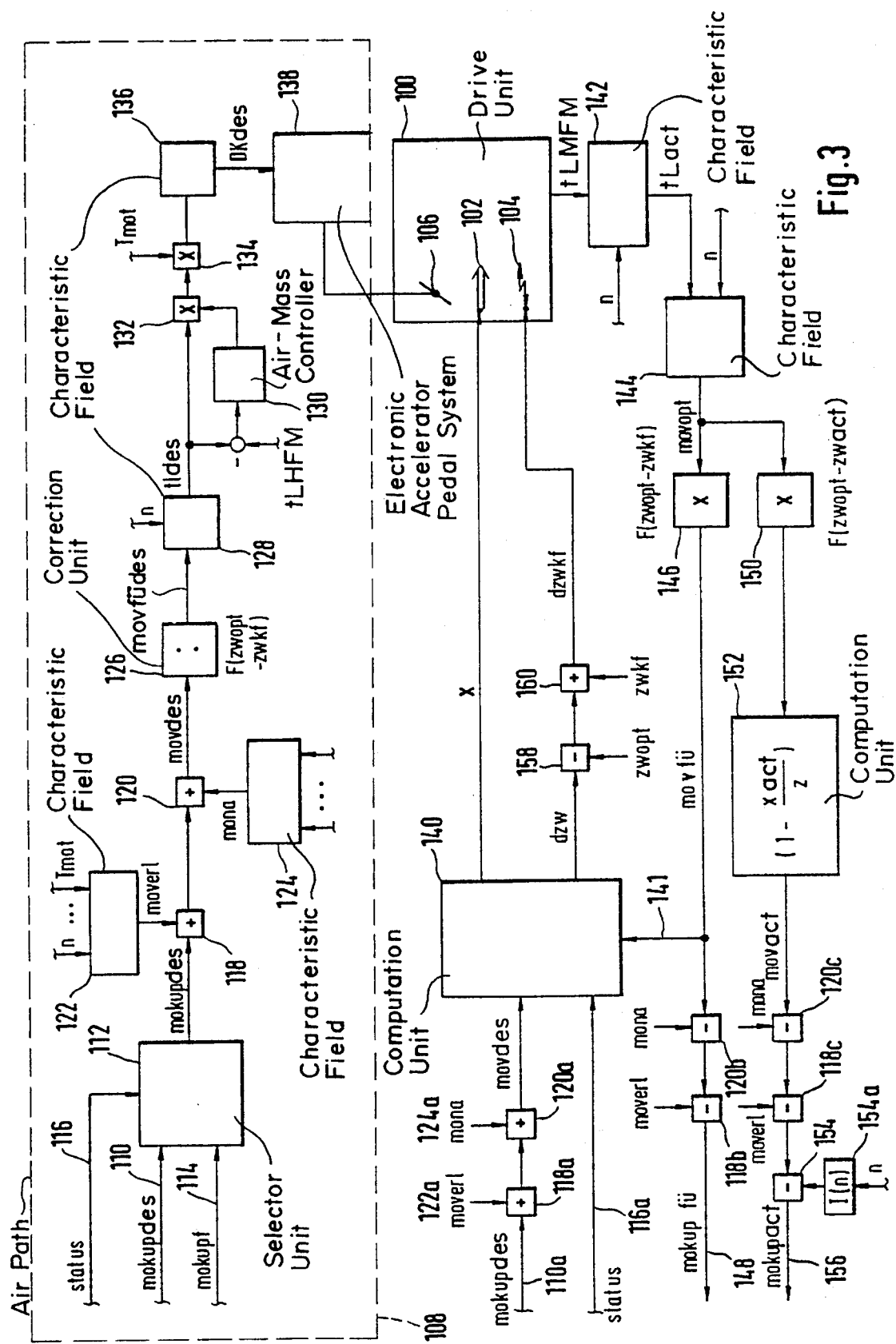
FIG. 3 shows a realizable form of the interface position as a block circuit diagram.

FIG. 3 shows the structure of a preferred embodiment of the unified motor torque interface position in the area of the motor control. A desired clutch torque mokupf from the driver and an intervention torque mokupdes from the component systems 18 to 22 as well as data with respect to the status of available component systems (for example, whether ASR or MSR is activated) are transmitted to the motor control.

A block circuit diagram is selected as a means of illustrating the interface position for reasons of clarity. Actually, the interface position of the invention is realized as a computer program. In FIG. 3, the same parameters and functions are used at different locations of the block circuit diagram. These parameters and functions are identified by the same reference numerals or are only indicated for reasons of clarity of illustration. It is understood that only a function element having the corresponding function is present and the result is applied at different locations of the computer program.

In FIG. 3, a drive unit 100 such as an internal combustion engine is shown which has assigned thereto symbolically illustrated units for controlling fuel metering 102, control of the ignition time point 104 as well as control of the supply of air 106 via a throttle flap. Alternatively, the drive unit can be a diesel engine for which, as a rule, the influencing of the air can be omitted or the drive unit can be an electric motor having the corresponding intervention possibilities.

FIG. 3 shows the interface position between the values supplied to the motor control system from the component systems, the values emitted by the motor control system to the component systems and the intervention possibilities which, as a rule, are present. These intervention possibilities are on the air supplied, the fuel metered and the ignition time point. In conventional systems, the air supply is determined by the driver as a consequence of the mechanical connection of the throttle flap with the accelerator pedal and can therefore not be influenced. For this reason, the "air path" 108 is enclosed by a broken line. The air path 108 is provided in systems wherein the air supply can be adjusted electrically. The term "air path" is used here to denote electronic circuitry which operates to adjust the throttle flap in a gasoline engine. Stated otherwise, electronics are substituted for conventional mechanical linkages.

A first line 110 conducts the clutch torque desired value mokupdes of one of the component systems to a selector unit 112. This unit is supplied with the driver command mokupf via a line 114 as well as with status data of the component systems via a line 116. The selector unit 112 carries out a minimal value selection or maximum value selection (for example, for ASR minimal selection and for MSR, maximum selection) of the desired torque values pregiven by the component systems and the driver command on the basis of the status data. The correction units 118 and 120 are connected downstream of the selector unit 112. The desired value transmitted from the selector unit is corrected with lost torque amounts moverl and consumer torque amounts mona of additional consumers. As known from the state of the art, the lost torques are determined from an adaptable characteristic field 122 from rpm and motor temperature and the lost torques are determined from an adaptable characteristic field 124 in dependence upon the operating state of ancillary aggregates such as air conditioners, steering, transmission, et cetera. Lost torque moverl and consumer torque mona are added to the desired value mokupdes in the correction units 118 and 120 which results in a desired value for the indexed torque or the combustion torque movdes. This desired combustion torque value is determined on the basis of the driver command or the intervention values of component systems and corresponds to a desired value which is to be adjusted under ideal conditions. For this reason, the desired combustion torque value is corrected with the actual ignition setting in a further correction unit 126 so that the desired torque amount movfüdes is obtained as a result. This desired torque amount has to be supplied by the charge (air supplied and fuel metered at lambda=1). The correction is made by dividing the torque desired value movdes by a function F dependent upon the difference between an optimal ignition angle zwopt and the particular ignition angle pregiven by the ignition characteristic field. The ignition angle zwopt as well as the pregiven ignition angle zwkf are read out of a characteristic field (not shown) in dependence upon load and rpm.

The desired combustion torque component of the air setting movfüdes is used for the charge-end torque setting. The desired combustion torque component is determined in the manner described above.

The desired torque value movfüdes is converted in a characteristic field 128, which follows the correction unit 126, in combination with the motor rpm (n) into an air-mass desired value tldes. Air-mass desired value tldes and the air-mass actual value tLHFM, which is detected, for example, by a hot film air-flow sensor, are supplied to an air-mass controller 130. The air-mass controller forms a measure for the deviation of the actual value from the desired value with which the desired value tldes is preferably multiplicatively corrected in a correction unit 132. A correction unit 134 follows the correction unit 132. In this correction unit 134, this desired value is also corrected in dependence upon motor temperature and supplied to the throttle-flap position desired value characteristic field 136. There, a throttle-flap position desired value dkdes for the setting of the throttle flap is formed on the basis of the corrected air-mass desired value. The throttle flap is adjusted by the electronic accelerator pedal system 138 and, if necessary, in dependence upon further variables such as throttle flap actual position, et cetera. The setting of the fuel flow to be metered takes place in a known manner on the basis of the air-mass value tlhfm and the rpm (n).

The "air path" 108 is framed by a broken line and is not active when there is mechanical coupling between the accelerator pedal and the throttle flap. The driver command mokupf is no longer read in by the motor control system and the torque value mokupfü is transmitted to the other component systems as a driver command when required. The torque value mokupfü is computed as described below on the basis of the charge (air/fuel mixture) of the internal combustion engine set by the driver. The torque value mokupfü is a measure for the combustion torque generated by the adjusted charge at a pregiven air/fuel ratio.

For the rapid motor intervention via ignition and/or fuel metering, it is likewise advantageous to split up the torque to be realized by the motor into a combustion torque (the mechanical energy generated by the compression phase) and a lost torque (drag torque or energy consumed by friction and throttle losses).

The intervention into the fuel to be metered takes place, as a rule, by suppressing the fuel metering at least to individual cylinders during specific work strokes. This procedure is known in the following as injection suppression. The injection suppression and the ignition angle intervention influence primarily the combustion torque mov of the engine less the loss or drag torque moverl in which friction and throttle losses are combined. For this reason, in the determination of the intervention in the metering of fuel via injection suppression and in the ignition angle by ignition angle correction, the desired clutch torque mokupdes is converted with the motor drag torque moverl and the consumer torque of ancillary aggregates mona into a combustion torque desired value movdes as already explained with reference to the air path.

The determination of the desired combustion torque movdes can already take place in the component systems or in a higher-level control unit because the engine drag torque and the consumer torque are essentially constant or can be adapted by known methods (see the state of the art mentioned above). In this way, no clutch torque desired value is transmitted to the engine control but instead a combustion torque desired value. In the same manner, the motor power Pdes to be supplied can be determined in the component systems or in the higher-order control unit, and be transmitted to the engine control system. In the two last cases, the interface position then operates on the basis of combustion torque values or the engine power values.

The computation of the desired combustion torque is shown in FIG. 3 by the elements having the reference numerals 110a, 118a, 120a, 122a and 124a. The procedure corresponds to that described with respect to the air path. In the computation unit 140, which is downstream of these elements, the combustion desired torque movdes is converted into a measure for the ignition angle correction dzw and/or into a measure for the injection suppression X, for example, by suppressing the injection of X cylinders within a pregiven number of crank angle rotations (X can also be less than 1). This conversion is made while considering the status data of the component system 116a and the combustion torque amount movfü generated by setting the charge. The combustion torque amount movfü is supplied via line 141 and is determined as will be described in the following. The function defined by computation unit 140 is a general function for determining ignition angle intervention and/or injection intervention which is shown in the advantageous embodiments according to FIGS. 4 to 6.

The combustion torque movfü generated by the charge of the air/fuel mixture is then a value for normal conditions (ignition angle pursuant to rpm/load characteristic field without ignition angle intervention with the exhaust gas composition lambda=1).

A characteristic field 142 is known from German patent application 4,232,974 and is a so-called charge model. The characteristic field 142 forms a measure for the air mass flow tlact flowing to the engine from the rpm and air mass measured value tLHFM. This measure is converted into an optimal combustion torque value movopt in the next-downstream motor characteristic field 144 in combination with the rpm and referred to the ignition angle zwopt which is optimal with respect to the power or torque output. This value is corrected by a function F in the following multiplication unit 146. This function F is dependent upon the difference between the optimal ignition angle zwopt and the characteristic field angle zwkf (see block 126) which is to be selected under the particular operating conditions (no ignition angle intervention) which are just then present. The value corrected in this manner corresponds to the combustion torque movfü generated by the charge under normal conditions and which is supplied to the characteristic field 140.

The combustion torque value movfü determined in this manner is converted into a clutch torque value at the ignition field angle mokupfü. This conversion takes place while correcting (subtraction) with the torque amounts by consumers mona determined as shown above as well as torque drag value moverl in the correcting units 118b and 120b. The clutch torque value is made available to the component systems via the line 148.

The optimal combustion torque value movopt is determined in the characteristic field 144. This combustion torque value movopt is converted into a measuring value for the clutch torque mokupact which is actually present and is supplied via the line 156, as required, to the component systems. This conversion is achieved via correction with a function F which is dependent upon the difference of the optimal ignition angle zwopt and the actual adjusted ignition angle zwact (that is, as required, while considering other corrections such as for knock control or idle control) in a correction unit 150. This correction in correction unit 150 is made while considering the possible suppressed injections in the computation unit 152 as well as the subtraction of consumer torque amounts mona and loss torque amounts moverl in the correcting units 118c and 120c and while subtracting the torque amount determined in a computation unit 154a in dependence upon the motor rpm changes.

In addition, the number of injections to be suppressed are supplied to the injection system 102. This number is determined in characteristic field 140 and the injection system 102 carries out the presetting, for example, via a sequential suppression pattern. (In a sequential suppression pattern, fuel injection is, for example, suppressed to one cylinder and then to a next cylinder and so on.) The ignition angle correction value dzw is converted into a correction amount of the characteristic field ignition angle dzwkf and is supplied to the ignition system 104 for adjustment. This conversion takes place in a first correcting unit 158 and in a second correcting unit 160 by subtracting the optimal ignition angle zwopt and adding the characteristic field ignition angle zwkf.

In this context, it should be noted that the interface position described in FIG. 3 describes all three influence possibilities on the power parameter of the motor. In advantageous embodiments, all of these three parameters can be influenced electronically so that the interface position can be realized in the manner shown. The formulas shown below apply to the computations in the block 140 for determining the ignition correction and/or the suppressions.

In other embodiments, however, only ignition angle intervention (FIG. 4) and/or injection suppressions (FIGS. 5 and 6) can be considered without electrical intervention possibilities in the supply of air. Even in these embodiments, the interface position structure shown in FIG. 3 can be applied unchanged in an advantageous manner with respect to available intervention possibilities. The block 108 enclosed by the broken line is omitted when the air is not influenced. The injection path and block 152 are omitted for exclusive ignition intervention (see FIG. 4) and for exclusive injection intervention (see FIG. 5), the correction of the ignition angle is omitted (blocks 158, 168 are omitted, blocks 150 and 146 are combined since zwkf=zwact). A configuration according to FIG. 6 is provided when ignition suppression and intervention with respect to ignition angle are considered.

Since the blocks satisfy the same functions as in FIG. 3, these blocks are provided with the same reference numerals and a description thereof is omitted and reference can be made to the description corresponding to FIG. 3.

A simplification of the interface position can be achieved by reducing the complexity of the characteristic fields and characteristic lines (for example, 122, 124, 128, 130, 140, 142, 144, et cetera). In this way, an interface position of any desired complexity can be realized without it being necessary to undertake interventions into the basic structure of the interface position.

In the following, the operation of the interface position will be described in greater detail with respect to various embodiments.

A torque reduction command is first described. If a rapid torque intervention is required, then this takes place by comparing the wanted combustion torque movdes and the combustion torque movfü generated under normal conditions by the charge. If movdes is less than movfü, the torque reduction takes place by changing the ignition angle and/or by suppressing injection pulses. The value movdes is less than movfü, for example, for an ASR intervention or as a consequence of a corresponding reduction command of the transmission control. A slower intervention for reduction takes place via the adjustment of the air supply. Here, various strategies for the ignition angle intervention and for the pattern of the injection suppression can be pursued. An adjustment of the supply of air in accordance with movdes takes place in parallel via the air path 108 when intervention is possible and, when an intervention is not possible, the air supply corresponds to the driver command and is considered in the value movfü.

Figure 4:
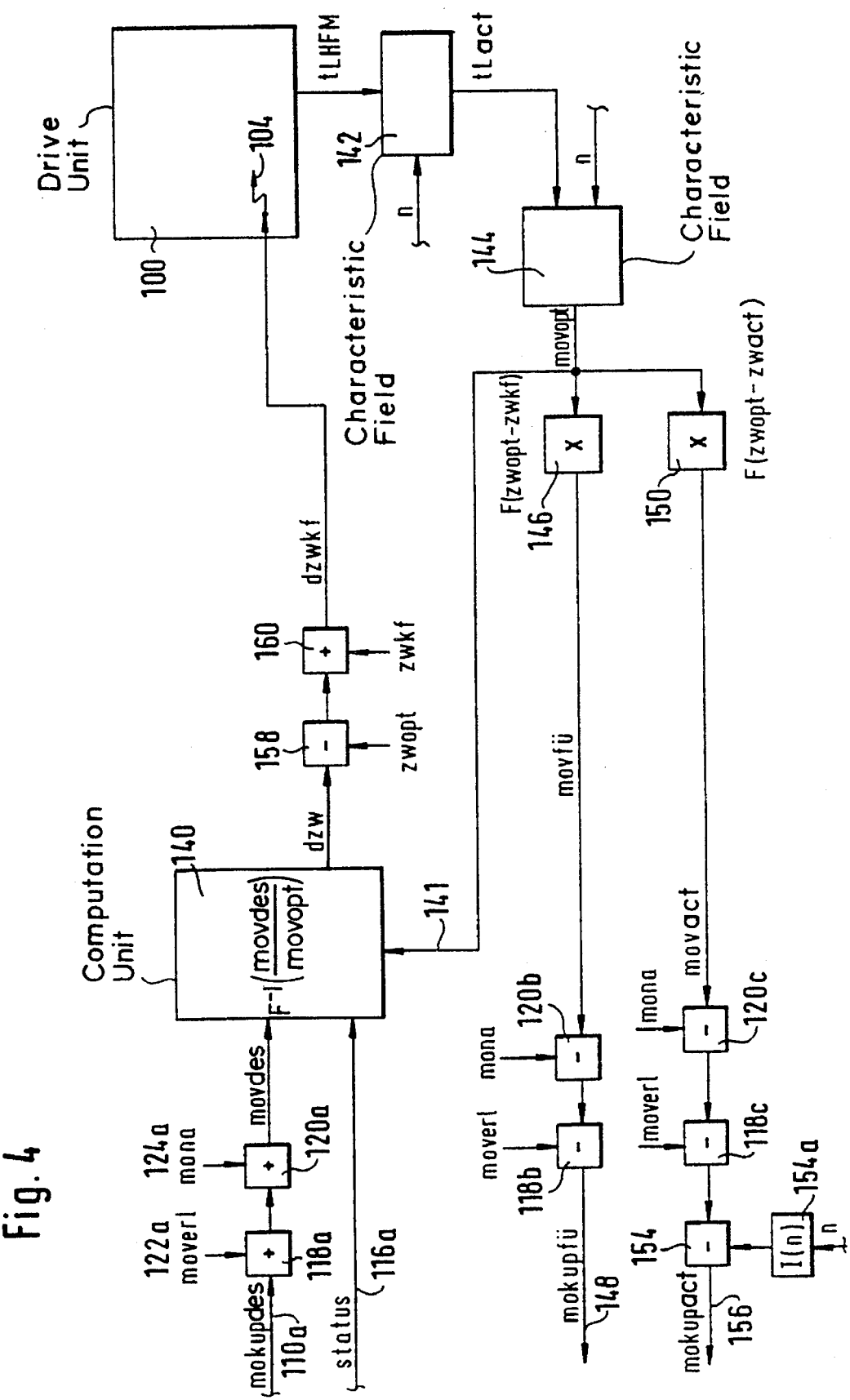
FIG. 4 shows the reduced interface position when only an intervention with respect to the ignition is intended.

First, the case is described wherein only the ignition angle intervention is possible (see FIG. 4). In this case, the relationship between the combustion torque desired value movdes and the ignition angle correction dzw is given by the following equation:

$$movdes = movopt * F(dzw) \quad (1)$$

wherein F(dzw) defines the torque reduction factor in dependence upon the ignition angle correction (in the form of a characteristic line) referred to the optimal ignition angle and is stored in a characteristic line and wherein dzw defines the difference between the desired ignition angle and the optimal ignition angle. The block 140 is connected via the line 141 to the output line of the block 144. This corresponds to the general configuration of FIG. 3 wherein movfü defines the basis of the computation of the ignition intervention and the injection intervention.

The ignition angle correction value dzw is referred to the optimal ignition angle zwopt and results then from the inverse factor in accordance with the following equation:

$$dzw = F^{-1}(movdes/movopt) \quad (2)$$

This computed value is limited to the maximum permitted ignition angle correction dzwmax which is a function of the inducted air mass and the rpm so that it is ensured that the mixture inducted by the cylinder can still be ignited. Thereafter, the ignition angle correction value dzwkf is determined referred to the characteristic field ignition angle of the ignition adjusting system zwkf by subtraction of the optimal ignition angle and addition of the characteristic field ignition angle (see equation 3). The characteristic ignition field angle zwkf is understood to be the ignition angle which would adjust itself without ignition angle intervention by the torque interface position.

$$dzwkf = dzw - zwopt + zwkf \quad (3)$$

No large torque change can be realized only with the ignition angle correction. For this reason, an application of the method with an exclusive ignition angle correction in combination with an electronic accelerator pedal system is advantageous since, in this case, only a rapid reaction is intended to be obtained with the ignition angle correction. The adjustment of the air supplied and the correction of the ignition angle take place simultaneously in this case.

Figure 5:
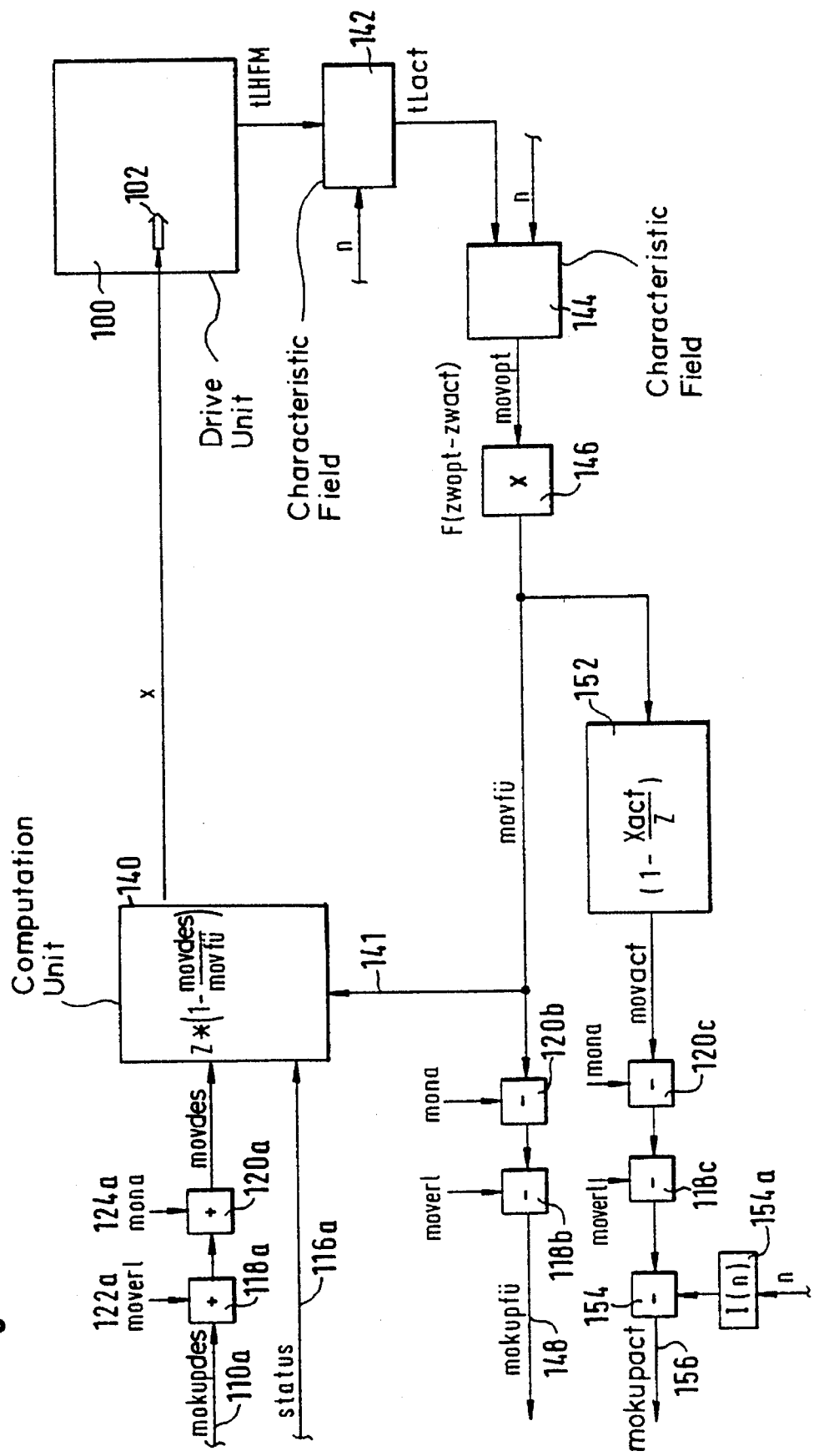
FIG. 5 is a reduced interface position for an exclusive intervention in the metering of fuel; and, FIG. 6 is an interface position when there is an intervention with respect to the ignition and with respect to the metering of fuel.
Figure 6:
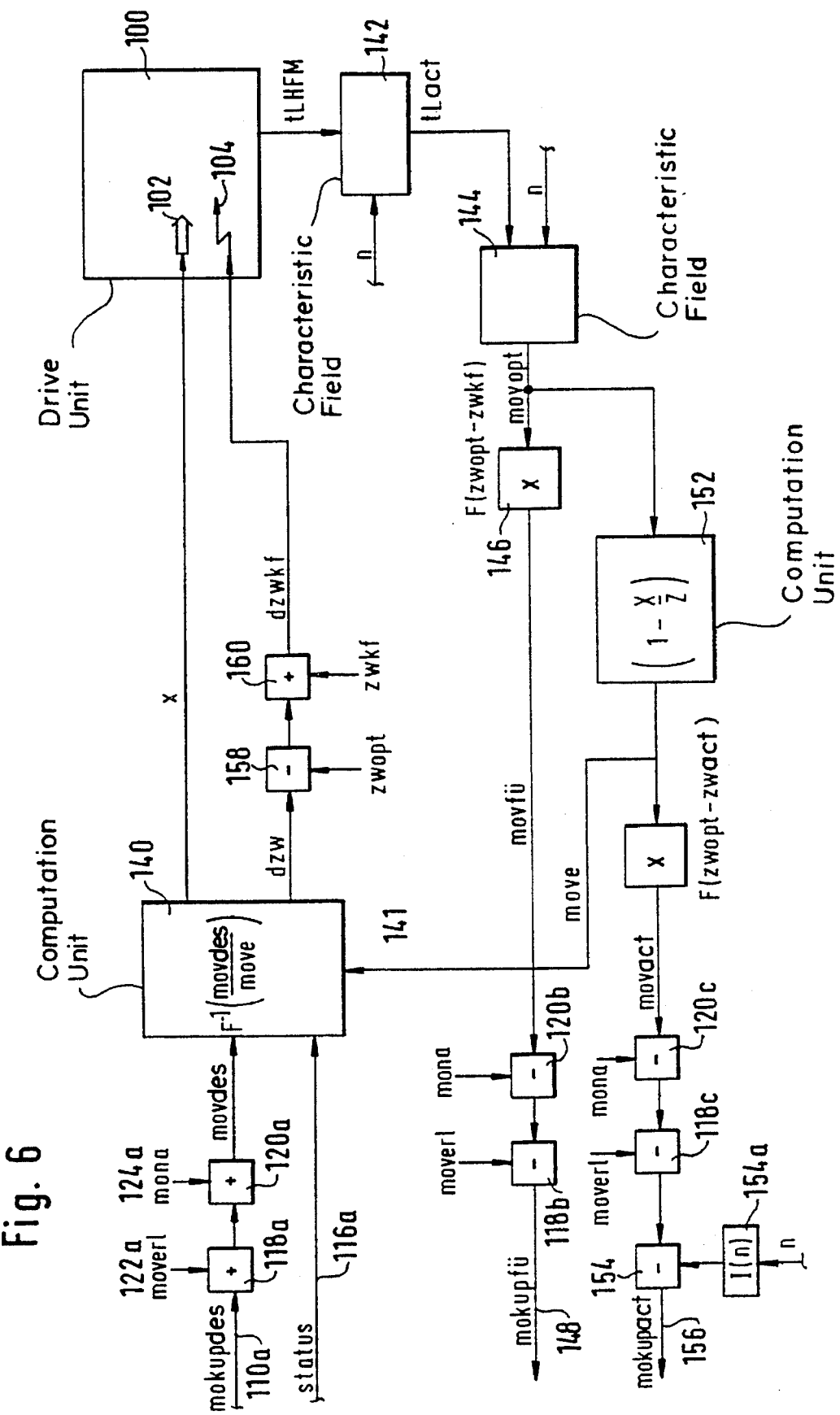

The torque reduction by exclusive intervention into the fuel metering by suppressing injection pulses offers a second possibility (see FIG. 5). A certain number of so-called suppression stages is provided. The Z suppression stages determine the number of the maximum possible stages of suppression of the cylinders. For example, for a four-cylinder engine, eight suppression stages are provided wherein individual cylinders are suppressed in accordance with the suppression stages over four crankshaft rotations (first stage, suppression of 0.5 cylinder; second stage, one cylinder; third stage 1.5 cylinder, et cetera). The eighth suppression stage can correspond to a complete suppression. Any desired factor of cylinder number is possible and is selected in accordance with the desired torque gap between two stages, that is, the difference of the torques in two mutually adjacent stages.

With the determination of the combustion torque supplied by the motor for suppressed cylinders, a certain number of crankshaft rotations must be averaged with the number of the crankshaft rotations corresponding to the number of the available suppression stages. This would be four crankshaft rotations in the above example.

The relationship between the desired combustion torque movdes and the combustion torque movfü generated by the adjusted air supply results as follows for X suppressed cylinders (suppression stage X) for Z possible suppression stages and for the characteristic field ignition angle zwkf, which remains constant at least for the cylinders which are not suppressed:

$$movdes = (1 - X/Z) * movfü \quad (4)$$

In equation (4), it should be considered that the component to the combustion torque movfü from a suppressed cylinder is zero. If the above equation is solved for X, then there results the suppression stage suitable for making available the desired combustion torque or the suitable number of cylinders to be suppressed via a pregiven crankshaft angle:

$$X = Z * (movfü - movdes)/movfü \quad (5)$$

The computed value of X (see block 140) must then be rounded off in order to obtain a permitted or available suppression stage. By rounding out upwardly, a somewhat larger reduction compared to the desired torque reduction is obtained so that this can be a preferred measure.

The injection suppression pattern is most often carried out as a sequential pattern so that each cylinder is not supplied with fuel within a pregiven time in accordance with the extent of the injection suppression. This improves running of the engine and prevents a too intense cooling off of the cylinders which are switched off.

The intervention in the metering of fuel and in the ignition angle is a further embodiment for reducing torque (see FIG. 6). In this connection, it should be noted that in FIG. 6, an effective combustion torque move is used in lieu of the use of the value movfü in block 140. The combustion torque move already considers the suppression of cylinders referred to the optimal ignition angle. This defines only another possibility of computation. The suppressed cylinders are taken into account for the determination of the combustion torque in block 140 in the embodiment of FIG. 3.

The torque reduction results from a combination of the above-mentioned cases by means of the following equation:

$$movdes=(1-X/Z)*movopt*F(dzw) \qquad (6)$$

Two strategies can be pursued for determining the desired combustion torque.

For the first strategy, a higher priority can be assigned to the ignition angle intervention than to the injection suppression in order to, for example, reduce the exhaust gas emission. This means that the ignition angle intervention is permitted in dependence upon pregiven clutch torque desired values up to its maximum permitted ignition angle change dzwmax and only then, when a still greater torque reduction is demanded, suppression of cylinders is permitted. For this reason, first the number of the reduction stages according to equation (6) is set to 0 and the ignition angle correction dzw is computed as in the case of the exclusively available ignition angle correction according to equation (2). If the ignition correction value is less than the pregiven maximum value, then no injection suppression takes place and the ignition angle intervention takes place as described above. However, if it has been recognized that the ignition angle correction value dzw is greater than the maximum pregiven correction value, then the number of cylinders to be suppressed is computed according to equation (6) by inserting the maximum ignition angle correction value dzwmax and is defined by the following equation:

$$X=Z*(movopt*F(dzwmax)-movdes)/(movopt*F(dzwmax)) \qquad (7)$$

The pregiven number of cylinders is suppressed by rounding off in the upward direction and selecting the suppression pattern. If a very precise realization of the desired clutch torque is required, then the value of the number of suppressed cylinders is again inserted into the above equation (6) and an ignition angle correction value dzw is determined in accordance with the following equation:

$$dzw=F^{-1}(movdes/(movopt*(1-X/Z))) \qquad (8)$$

In the above case, the injection suppression pattern can be coarse and can, for example, be limited to a number of stages corresponding to the cylinder number. The torque gap occurring between two suppression stages is compensated by the ignition angle correction. Equation (8) described above applies only when the number X is less than the total number Z of the suppression stages. If these two values are equal, then no ignition angle correction takes place and the motor reaches its minimum torque mokupmin which contains the lost torque because of drag torque and ancillary consumers. A further reduction of the drive power is not possible by a motor intervention and must take place, for example, by braking intervention or transmission intervention. Here, it should be considered that for motor vehicles wherein the air supply is influenced electrically, an adjustment of the air takes place at the same time as an adjustment of fuel and ignition.

The second strategy provides that the injection suppression has a higher priority than the ignition angle intervention. With this strategy, the ignition angle correction is used only for fine metering of the motor torque between two suppression stages.

In this procedure, the ignition angle correction value dzw is set in equation (6) to the difference between the optimal ignition angle and the characteristic field ignition angle. The number of cylinders X to be suppressed then results from equation (5). This value is rounded down to a whole integer and thereafter, the ignition angle correction value dzw is computed from equation (8) by inserting the number of the cylinders X to be suppressed. The ignition angle correction value is then placed into relationship to the characteristic field ignition angle and the characteristic field ignition correction value in accordance with equation (3). From the computed number of cylinders to be suppressed, a suppression pattern is determined and realized by the injection system. Here, the number of stages of the injection suppression can also be small, especially, the number of stages can correspond to the cylinder number. The torque gap between two stages is compensated by the ignition angle correction.

A comparable procedure is undertaken with a torque increase command, for example, by an MSR intervention or by the transmission control.

Here, the clutch desired torque mokupdes (movdes) is greater than the torque amount mokupfü (movfü) generated by the charge under normal conditions. The rapid torque build-up can only take place by ignition angle change up to the optimal ignition angle zwopt or up to the knock limit. A torque increase above an ignition angle change can no longer be obtained since the characteristic field ignition angle lies mostly close to the optimal ignition angle. The requirement of rapid torque increase from MSR can be obtained in overrun in that the number of cylinders to be suppressed is computed according to equation (5) and the difference between the maximum number of suppressed stages and the number of cylinders to be suppressed is inserted. The overrun switchoff is eliminated by the MSR.

Preferably, the requirement of the torque increase can be realized in that a clutch torque mokupdes is adjusted via the air path (idle controller or electronic accelerator pedal, see FIG. 3). In the case of idle, basically no external motor intervention is permitted. The idle data, as also, for example, the overrun data, during which no ASR intervention is possible, is supplied to the component systems via the interface position.

The motor drag torque moverl is made up of the motor friction loss and the motor throttle loss and is dependent upon engine temperature, engine rpm and intake-pipe pressure. This value can advantageously be broken up into a drag torque for intake-pipe pressure 0 (closed throttle flap, air flow 0) and into a torque correction dmoverl in dependence upon intake-pipe pressure:

$$moverl=moverl\ (Ps=0)-dmoverl\ (Ps) \qquad (9)$$

The drag torque for a closed throttle flap can likewise advantageously be broken up into a drag torque dependent upon the motor rpm and into a drag torque dependent upon motor temperature and is adapted in idle in accordance with the state of the art. The torque requirement of ancillary equipment is determined in correspondence to this state of the art. The correcting variable of the drag torque can be determined in dependence upon the intake-pipe pressure by interpolation of a characteristic line. When no pressure sensor for measuring the intake-pipe pressure is present, then the intake-pipe pressure is substituted for by the product of the intake-pipe temperature and the charge since the intake pressure is proportional to the product of charge and intake-pipe temperature.

The actual motor torque mokupact is computed from the actually realized number of suppressed cylinders X and the ignition angle actual value in accordance with equation (6) while considering the drag torque and the torque amounts of the ancillary equipment or the inertial torque of the motor.

This value together with the minimum torque mkupmin (=−(moverl+mona)) and the clutch torque mkupfü prepared by the charge under normal conditions is preferably supplied to other control apparatus. The maximum obtainable clutch torque mokupmax which is obtainable is also supplied to other control apparatus while considering the instantaneous air density. The clutch torque mokupfü under normal conditions serves then as a reference point for the control in other control apparatus, for example, for ASR, a maximum permissible clutch torque mozul is computed from the wheel slippage. If this value is less than the clutch torque under normal conditions, the ASR status bit is set and the permissible clutch torque is transmitted to the motor control as the clutch torque desired value. When the permissible clutch torque is greater than the clutch torque available under normal conditions, the ASR status bit is reset and the intervention is terminated. For MSR, the procedure is the opposite as with ASR.

With the transmission control, a desired rapid torque increase can be realized in an advantageous manner during gear shifting in that the transmission control presets the torque desired after the gear-shifting operation via the driver command, however, the clutch torque to be actually realized during the gear-shifting operation is emitted via the torque intervention mokupdes. Here, the clutch torque mokupfü, realized by the charge under normal conditions, is greater than the instantaneously required clutch torque mokupdes. The torque difference between these two values is compensated by the ignition angle correction and the increase of the actual clutch torque in response to the driver command is realized after gear shifting by cancelling the ignition angle correction.

The correction of the combustion torque movopt for an optimal ignition angle from a torque characteristic field is, for various motor rpms, essentially linear in dependence upon the charge tlact and can be simplified advantageously for less precise requirements as follows:

$$movopt = tlact * G(n) \qquad (10)$$

or:

$$movopt = tlact * G \qquad (11)$$

G(n) defines a rpm-dependent factor which is essentially determined by the rpm-dependent combustion efficiency and can be replaced by a mean factor without rpm dependency with further reduction of precision.

A corresponding procedure can be applied advantageously in combination with alternative drive concepts such as hydrogen motors.

It is understood that the foregoing description is that of the preferred embodiments of the invention and that various changes and modifications may be made thereto without departing from the spirit and scope of the invention as defined in the appended claims.

What is claimed is:

1. A method for controlling a motor vehicle having at least two component systems interconnected via a communication system for facilitating an exchange of data between the component systems, the motor vehicle further having a drive unit generating torque and a first one of said component systems being a first control unit for controlling the torque of said drive unit, a second one of said component systems being a second control unit for operating on said torque in at least one operating state, the method comprising the steps of:

generating a desired torque value (mokupdes) in said second control unit indicative of the magnitude of the torque to be outputted by said drive unit;

transmitting said desired torque value (mokupdes) from said second control unit via said communication system to said first control unit;

forming an electrical output signal in said first control unit based on said desired torque value (mokupdes) to adjust said torque of said drive unit to correspond to said desired torque value (mokupdes);

determining values (tlHFM, n) in said first control unit which correspond to at least one operating variable of said drive unit and said vehicle and computing from said values (tlHFM, n) an actual torque (mokupact) outputted by said drive unit; and, transmitting said computed actual value (mokupact) from said first control unit to said second control unit via said communication system.

2. The method of claim 1, wherein said desired torque value (mokupdes) varies continuously and said torque is continuously adjusted by said first control unit to correspond to said input desired value (mokupdes).

3. The method of claim 1, further comprising the steps of:

converting said desired torque value (mokupdes) utilizing said first control unit into at least one of the following quantities:

(a) a pregiven number (X) of injections to the cylinders of the engine to be suppressed or activated and, (b) a correction (dzwkf) of the ignition angle to be adjusted, to adjust said torque to correspond to said desired torque value (mokupdes).

4. The method of claim 3, wherein said desired value (mokupdes) is converted into a quantity for adjusting the air supplied to the engine.

5. The method of claim 3, wherein said engine generates a combustion torque, the method comprising the further step of supplying a desired value to said first control unit with respect to said combustion torque.

6. The method of claim 3, wherein the engine generates power, the method comprising the further step of supplying a desired value to said first control unit with respect to said power.

7. The method of claim 1, wherein the drive unit is an internal combustion engine to which injections of fuel are supplied, the method further comprising the step of converting said desired torque value (mokupdes) into a pregiven number (X) of injections to be suppressed or activated so that said torque is adjusted in said operating state to correspond to said desired torque value (mokupdes).

8. The method of claim 1, wherein the drive unit is an internal combustion engine to which air and injections of fuel are supplied, the engine having an adjustable ignition angle; and, wherein the motor vehicle has a plurality of component systems and a third one of said component systems being a drive-slip control unit; a fourth one of said component systems being an engine drag torque control unit; a fifth one of said component systems being a transmission control unit and a sixth one of said component systems being a suspension control unit; and, the method further comprising causing each of said third to sixth component systems to emit an instantaneous command to said first component system for said torque which is conditioned by correcting any one of: the ignition angle, said injections and said air supplied to said engine.

9. The method of claim 1, wherein the engine has a predetermined number of cylinders and an adjustable ignition angle, the method further comprising converting said input desired value (mokupdes) into a correction (dzwkf) of the ignition angle to be adjusted so that said torque is adjusted in said operating state to correspond to said desired torque value (mokupdes).

10. The method of claim 7, wherein the engine has a predetermined number of cylinders and an adjustable ignition angle, the method further comprising: converting said desired torque value (mokupdes) into a correction (dzwkf) of said ignition angle to be adjusted so that said torque is adjusted in said operating state to correspond to said desired torque value (mokupdes).

11. The method of claim 10, further comprising a plurality of component systems and a third one of said component systems being a drive-slip control unit; a fourth one of said component systems being an engine drag torque control unit; a fifth one of said component systems being a transmission control unit and a sixth one of said component systems being a suspension control unit; and, the method further comprising causing each of said third to sixth component systems to emit an instantaneous command to said first component system for said torque which is conditioned by correcting any one of: said ignition angle, said injections and said air supplied to said engine.

12. The method of claim 1, wherein said desired torque value (mokupdes) varies continuously and said first control unit continuously converts said desired torque value (mokupdes) to adjust said torque to correspond thereto.

13. The method of claim 1, wherein the drive unit and the motor vehicle have operating variables which characterize the operation thereof, the method comprising the further steps of:

collecting data as to at least one of the operating variables of said engine and said motor vehicle which is indicative of the torque actually outputted by said drive unit in response to said electrical output signal;

performing a computation in said first control unit based on said collected data to obtain an output actual value (mokupact) indicative of the actual value of said torque outputted by said drive unit as determined from the collected data; and, transmitting said output actual value (mokupact) to said second component system via said communication system.

\* \* \* \* \*